(12) United States Patent
Weissenberger (10) Patent No.: US 11,104,112 B2
(45) Date of Patent: Aug. 31, 2021

(54) METHOD FOR PRODUCING A PLASTIC VEHICLE ADD-ON PART

(71) Applicant: SAINT-GOBAIN GLASS FRANCE, Courbevoie (FR)

(72) Inventor: Uwe Weissenberger, Wuerzburg (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 248 days.

(21) Appl. No.: 16/086,594

(22) PCT Filed: May 8, 2017

(86) PCT No.: PCT/EP2017/060877
§ 371 (c)(1),
(2) Date: Sep. 19, 2018

(87) PCT Pub. No.: WO2017/215840
PCT Pub. Date: Dec. 21, 2017

(65) Prior Publication Data
US 2019/0084285 A1  Mar. 21, 2019

(30) Foreign Application Priority Data

Jun. 14, 2016 (EP) .................................. 16174290

(51) Int. Cl.
*B32B 37/00* (2006.01)
*B44C 1/00* (2006.01)
(Continued)

(52) U.S. Cl.
CPC .......... *B32B 37/025* (2013.01); *B44C 1/1729* (2013.01); *B32B 2605/003* (2013.01);
(Continued)

(58) Field of Classification Search
None
See application file for complete search history.

(56) References Cited

U.S. PATENT DOCUMENTS 4,350,550 A * 9/1982 Van Manen ............. B05D 5/06
156/237
4,826,713 A    5/1989 Cook
(Continued)

FOREIGN PATENT DOCUMENTS

CN    103619587 A    3/2014
CN    103842146 A    6/2014
(Continued)

OTHER PUBLICATIONS

International Search Report for international Patent Application No. PCT/EP2017/060877 filed May 8, 2017 on behalf of Saint-Gobain Glass France, dated Jul. 14, 2017. 7 pages (English Translation + German Original).
(Continued)

*Primary Examiner* — Jacob T Minskey
*Assistant Examiner* — Matthew Hoover
(74) *Attorney, Agent, or Firm* — Pillsbury Winthrop Shaw Pittman LLP (57) ABSTRACT

A method for producing a polymeric vehicle add-on part having a decorative element is presented. According to one aspect, the method includes provision of a first polymeric material phase and transfer of a decorative element from a carrier film onto a first surface of the first polymeric material phase by hot stamping using a punch. A second polymeric material phase is then applied on the first surface of the first polymeric material phase so to arrange the decorative element between the first polymeric material phase and the second polymeric material phase. According to another aspect, the first polymeric material phase or the second polymeric material phase is transparent.

16 Claims, 4 Drawing Sheets

(51) Int. Cl.
*B44C 1/17* (2006.01)
*B60R 13/00* (2006.01)
*B60R 13/02* (2006.01)
*B60R 13/04* (2006.01)

(52) U.S. Cl.
CPC ......... *B32B 2605/006* (2013.01); *B60R 13/00* (2013.01); *B60R 13/02* (2013.01); *B60R 13/04* (2013.01)

(56) References Cited

U.S. PATENT DOCUMENTS

| | | |
|---|---|---|
| 7,547,372 B1 | 6/2009 | Sloan |
| 9,477,203 B2 | 10/2016 | Menz |
| 2007/0269671 A1* | 11/2007 | Hirschfelder ....... B29C 45/1418 428/542.6 |
| 2008/0095992 A1 | 4/2008 | Hirschfelder et al. |
| 2008/0213541 A1 | 9/2008 | Schilling et al. |
| 2009/0274922 A1 | 11/2009 | Roys et al. |
| 2014/0295129 A1 | 10/2014 | Lux et al. |
| 2016/0031135 A1 | 2/2016 | Hicks et al. |
| 2017/0326860 A1* | 11/2017 | Benyahia .............. B32B 27/365 |

FOREIGN PATENT DOCUMENTS

| | | |
|---|---|---|
| DE | 19940244 A1 | 4/2000 |
| DE | 10 2011 050 746 A1 | 12/2012 |
| DE | 10 2011 050746 A1 | 12/2012 |
| DE | 10 2013 000400 A1 | 7/2014 |
| EP | 1 424 709 A1 | 6/2004 |
| EP | 2 301 736 A1 | 3/2011 |
| EP | 2 689 929 A1 | 1/2014 |
| JP | S63-062800 A | 3/1988 |
| JP | H08-002714 B | 1/1996 |
| JP | H08-18345 B2 | 2/1996 |
| JP | H08-276462 A | 10/1996 |
| JP | H09-11275 A | 1/1997 |
| JP | H09-183142 A | 7/1997 |
| JP | 2008-055271 A | 3/2008 |
| JP | 2009-149318 A | 7/2009 |
| WO | WO 2012/083007 A2 | 6/2012 |
| WO | 2013/050208 A1 | 4/2013 |
| WO | WO 2013/050208 A1 | 4/2013 |
| WO | 2016/096184 A1 | 6/2016 |
| WO | WO 2016/096184 A1 | 6/2016 |

OTHER PUBLICATIONS

Second Office Action as issued in Chinese Patent Application No. 201780001191.5, dated Aug. 28, 2020.
Geoli, C. (editor)., "Special Printing Technology," Printing Industry Press, (2009), p. 164.

* cited by examiner

METHOD FOR PRODUCING A PLASTIC VEHICLE ADD-ON PART

CROSS REFERENCE TO RELATED APPLICATIONS

The present application is the U.S. national stage of International Patent Application PCT/EP2017/060877 filed internationally on May 8, 2017, which, in turn, claims priority to European Patent Application No. 16174290.3 filed on Jun. 14, 2016.

The invention relates to a method and an apparatus for producing a polymeric vehicle add-on part, a polymeric vehicle add-on part, and use thereof.

In the wake of increasingly stringent requirements regarding carbon dioxide emissions of motor vehicles, there are strong efforts to reduce the weight of a vehicle and, hence, its fuel consumption. Constant innovations in the plastics sector enable the replacement of large parts of the metal car body with correspondingly lighter elements made of polymeric materials. In particular, parts or even the entire window region can be replaced by elements made of polymeric materials. Along with a significantly lower weight, in many cases, these present hardness, stability, and toughness comparable to that with a car body window made of steel. Additionally, due to the weight reduction, the center of gravity of the vehicle is moved lower, which has a positive effect on handling. Molded parts made of polymeric materials can be produced in virtually any desired shape and geometry.

Many material parts made of plastic must comply with various requirements and functions. In this regard, important parameters are stability, fracture behavior, scratch resistance, impact strength, or notched impact strength. In addition to technical considerations such as weight and strength of the individual components, shape, geometry, and appearance play an increasingly important role. Especially in the automobile industry, in addition to mechanical properties, characteristics in the area of design and aesthetics are also of major significance.

One established method for generating visual effects is the method for film insert molding (FIM). In this method, an appropriate film is laid in the injection mold and back injected with a suitable plastic. In this manner, the surface properties and geometry of polymeric materials can be selectively and versatilely affected and modified. A method for producing polymeric add-on parts using film insert molding is, for example, known from WO2013/050208. Temperature-stable films are an important prerequisite for the use of the method of film insert molding. In addition, imprints situated on the film must be temperature resistant enough to withstand back injection with a liquid polymer such as a polycarbonate. EP2689929A1 discloses the structure of a film suitable for film injection molding with a metal layer as a decorative element.

It is also known to provide polymeric workpieces with decorative elements using hot stamping methods. Thus, WO2016/096184A1 discloses a method for producing a polymeric vehicle add-on part that can consist of a plurality of polymeric material phases. The decorative element is imprinted on an outer surface of the add-on part imprinted, where it is exposed to environmental influences. The add-on part is provided, after hot stamping, with a protective coating to protect the decorative element against damage.

U.S. Pat. No. 7,547,372B1 discloses the structure of a hot stamping film that is also suitable for use on vehicle add-on parts.

The object of the invention is to provide another method for producing a polymeric vehicle add-on part with a decorative element. The decorative element should be protected against external influences and enable a visually appealing and readily visible design of the pane. In addition, the method should be simple to use industrially.

The object of the invention is accomplished by the method according to the disclosure. Preferred embodiments also emerge from the disclosure.

The method according to the invention for producing a polymeric vehicle add-on part with a decorative element comprises at least the following process steps:

(a) a first polymeric material phase is provided;

(b) a decorative element is transferred from a carrier film onto a first surface of the first polymeric material phase by hot stamping using a punch;

(c) a second polymeric material phase is applied on the first surface of the first polymeric material phase such that the decorative element is arranged between the first polymeric material phase and the second polymeric material phase, in particular at the interface of the two material phases.

The polymeric add-on part (or plastic add-on part) according to the invention is preferably an external add-on part, i.e., an add-on part for the exterior of the vehicle, or an add-on part for the vehicle interior. The add-on part, if it is provided as an external add-on part, is, in particular, a pane (in particular a vehicle window pane, for example, a roof window, rear window, side window), a pillar cover, a light cover, a radiator grill surround, a sun visor, a roof panel, a mirror housing, a frame member, a trim strip, a door sill, or a spoiler.

The add-on part, if it is provided for the interior, is, for example, a fitting or an instrument panel.

The invention enables, among other things, the visual upgrading and refinement of visible areas of plastic vehicle window panes, the introduction of data (in the form of text or symbols), the presentation of a variety of visual effects, and freedom in the color design of the add-on part through a variety of available hot stamping films.

The add-on part is secured on the vehicle via one of its surfaces. The opposite surface then forms, in the installation position, the surface accessible to the observer or user. In the context of the invention, this surface is referred to as the "outer surface" or "outward pointing" or "outward facing surface" of the add-on part. The material phase can also be referred to as "components" of the add-on part.

At least one of the two polymeric material phases is transparent. The transparent material phase is provided to point outward in the installation position of the add-on part—the outer surface of the add-on part is thus the surface of the first material phase facing away from the second material phase. Due to the position of the decorative element behind the transparent material phase, a glasslike impression with a depth effect is produced, which is very appealing visually. Moreover, the decorative element is protected between the two material phases against damage. These are major advantages of the present invention.

In a preferred embodiment, one of the two polymeric material phases is opaque. Thus, the add-on part includes a transparent and an opaque material phase. This reinforces the visually appealing glasslike impression.

In the context of the invention, "transparent" means that an observer can see through the component and can discern objects that are behind the component from the standpoint of the observer. The transparent component can be colorless or also be colored or tinted. The transmittance of the transparent component in the visible spectral range is, for example, greater than or equal to 70%, preferably greater than or equal to 85%.

In the context of the invention, "opaque" means that an observer cannot see through the component. The transmittance of the opaque component in the visible spectral range is thus significantly reduced and is, for example, less than or equal to 10%, less than or equal to 5%, in particular approx. 0%.

In a particularly advantageous embodiment, the first polymeric material phase, on whose surface the decorative element is applied, is transparent and the second polymeric material phase is opaque. The initial provision of the transparent material phase and with the subsequent application of the opaque material phase has the advantage of a high optical quality of the add-on part. With the reversed procedure, there is a risk that at the time of the injection of the hot transparent polymer mass, parts of the already solidified opaque polymer mass (more precisely, the colorant dissolved therein) are dissolved and "washed out". This can result in the fact that the dissolved colorants settle as a black or gray cloud in the actually transparent material phase, which reduces the visual effect, in particular when the clouds are situated in front of the decorative element.

However, in principle, it is also possible and can be desirable in the individual case for the first polymeric material phase to be opaque and the second polymeric material phase transparent. In this case, the injection points of the transparent material phase should be far enough away from the decorative element such that any clouds in the transparent material phase do not spread over the decorative element. The clouds are less conspicuous for the observer and can be acceptable in the individual case.

Each of the two material phases, and, thus, also the add-on part as a whole, is typically designed substantially planar or sheetlike and has two primary surfaces and a peripheral side edge. One of the primary surfaces of the first material phase is the first surface according to the invention, on which the decorative element is applied.

The transparent material phase and the opaque material phase can be substantially congruent. Then, the entire add-on part is opaque, with a glasslike visual impression produced by the transparent material phase. However, the opaque component can also be present only in subregions of the add-on part. This is the case, for example, in windowpanes, where the opaque component is typically arranged in a peripheral edge region such that the pane can be glued to the vehicle body in a manner that is invisible to the observer.

According to the invention, the decorative element is applied on the first material phase by hot stamping. Hot stamping is frequently also referred to as "vertical stamping". Therein, the carrier film with the decorative element is arranged such that the decorative element faces the add-on part, in particular the first surface of the add-on part. Then, the punch acts on the surface of the carrier film facing away from the decorative element such that the decorative element is pressed against the first surface. Then, the carrier film is detached with the decorative element remaining on the first surface.

Preferably, the carrier film is configured as a film web situated on rollers and carries a large number of decorative elements, wherein at the time of hot stamping, a decorative element is arranged each case under the punch (in other words, between the punch and the add-on part). By means of the rollers, the film web can be advanced such that the next decorative element is transported under the punch and can be applied to the next add-on part. Thus, economical industrial mass production can be achieved. The individual decorative elements can be arranged separately on the carrier film. However, in practice, the entire carrier film can also appear with a continuous single layer or multilayer decorative coating, wherein the individual decorative elements are not separated from one another. The individual decorative elements are detached from the remaining coating only at the time of hot stamping through the adhesive action on the add-on part and thus individualized. The shape of the decorative element is determined by the design of the contact surface of the punch. However, the decorative elements can also already be individualized on the carrier film by perforation or incisions in the overall coating, thus facilitating detachment.

The punch has an elevated temperature, which is transferred to the carrier film and the decorative element, by which means the adhesion of the decorative element on the add-on part is promoted. The punch preferably has a temperature of 120° C. to 250° C., particularly preferably of 140° C. to 200° C. Thus, particularly good results are achieved. The exact temperature also depends on the film used and can be found by the person skilled in the art in the manufacturer data or determined by routine preliminary testing.

The contact surface of the punch preferably contains silicone or is made of silicone. The contact surface can, however, also include or be made of natural or synthetic rubber or other elastomers. The advantage resides in the soft design of the contact surface, by means of which damage to the add-on part can be avoided. However, the contact surface can also be made of metal.

In an advantageous embodiment, the punch acts with a pressure of 15 kg/cm² to 50 kg/cm² on the first surface, preferably from 20 kg/cm² to 40 kg/cm², particularly preferably from 25 kg/cm² to 35 kg/cm². Thus, particularly good adhesion of the decorative element is achieved and the add-on part is nevertheless protected.

The exposure time of the punch on the first surface for applying the decorative element is preferably at least 1 s, particularly preferably at least 2 s. The exposure time can, for example, be from 1 s to 10 s, preferably from 2 s to 4 s. This is advantageous in terms of good adhesion, on the one hand, and a short cycle time, on the other.

The decorative element is preferably implemented in the form of a film. The decorative element is particularly preferably implemented as a multilayer film. In a particularly advantageous embodiment, the decorative element comprises at least a decorative layer and an adhesive layer. The layers are arranged on the carrier film in the order indicated with increasing distance from the carrier film. The decorative element makes contact with the add-on part via the adhesive layer. When the decorative element has been transferred onto the add-on part, the order, with increasing distance from the first surface is: adhesive layer—decorative layer.

The adhesive layer effects adhesion between the decorative element and the add-on part. The adhesion between the decorative element and the add-on part is thus stronger than between the decorative element and the carrier film, as a result of which the decorative element is released from the carrier film. By means of the adhesive layer, the decorative element is durably stably secured on the surface of the polymeric material phase. The adhesive layer contains, in a preferred embodiment, an acrylic-based adhesive. This effects particularly good adhesion through the formation of covalent bonds and van der Waals forces. This effect is particularly pronounced when the add-on part contains polycarbonate. However, alternatively, the adhesive layer can also include other suitable materials that promote adhesion, for example, polyurethane or epoxy-resin. The adhesive layer preferably has a thickness of 0.1 µm to 5.0 µm. Thus, good adhesion is achieved without excessively increasing the thickness of the decorative element, which would degrade the visual impression. The adhesive layer is preferably transparent such that the view of the add-on part is not impaired by the adhesive layer.

The decorative layer carries the actual visual effect of the decorative element. Consequently, it can be referred to as a color layer. The decorative layer is a polymeric layer, thus, includes a polymer. A large number of polymers are suitable as the basic material for the decorative layer, for example, polymethylmethacrylate. The decorative layer preferably has a thickness from 1.0 µm to 10.0 µm. In order to produce the visual impression of the decorative element, the decorative layer can, for example, be provided with an imprint or include embedded colorant. Colorants are pigments or dyes that can be inorganic or organic in nature and colored or achromatic. Suitable as printing ink or insertions are, for example, temperature-stable organic pigments or dyes (such as urethane acrylate polymers, azo dyes, or polycyclic compounds) or inorganic pigments (such as carbon, titanium dioxide, carbon black, cinnabar, bismuth (bismuth vanadate), spinel pigments, pigments of lead, mercury, zirconium, iron, cadmium, copper, cobalt, nickel, chromium; aluminosilicate (ultramarine)). The decorative layer can be monochromatic or multi-chromatic, can include different shades (for example, different grayscales), be designed with full or partial surface effects and/or be implemented as metallic effects.

The decorative layer can be the uppermost layer of the decorative element and be in contact with the second material phase. Preferably, however, in addition to the adhesive layer and the decorative layer, the multilayer decorative element includes a protective layer. The decorative element then comprises at least the protective layer, the decorative layer, and the adhesive layer, which are arranged on the carrier film in the order indicated with increasing distance from the carrier film. When the decorative element has been transferred onto the add-on part, the order is, with increasing distance from the first surface: adhesive layer—decorative layer—protective layer.

The protective layer protects the decorative layer against mechanical influences during the injection of the second material phase. The protective layer is preferably a protective lacquer. The protective layer preferably contains an acrylic polymer, polymethylmethacrylate (PMMA), or polyurethane (PU). The protective layer preferably has a thickness of 0.5 µm to 5.0 µm, with which particularly good results are achieved.

The total thickness of the decorative element is preferably as much as 100 µm, particularly preferably from 2 µm to 20 µm, most particularly preferably from 4 µm to 10 µm. Thus, a clear visual effect is achieved.

The size and design of the decorative element can be freely selected according to the requirements in the individual case.

The carrier film typically has a thickness from 10 µm to 500 µm, preferably from 10 µm to 50 µm, particularly preferably from 15 µm to 30 µm. In principle, the carrier film can also be thicker (making it, however, more expensive) or even thinner (as long as adequate stability is ensured). The carrier film preferably includes polyethylene terephthalate (PET), polycarbonate (PC), polybutylene terephthalate (PBT), styrene acrylonitrile (SAN), or mixtures or copolymers thereof, for instance, polycarbonate-polybutylene terephthalate (PBT/PC). Thus, adequate stability is achieved.

In an advantageous embodiment, a release layer is arranged between the carrier film and the decorative element. The release layer facilitates the detachment of the decorative element from the carrier film after hot stamping. The release layer has, for example, a thickness from 0.1 µm to 5.0 µm.

In a preferred embodiment, at least the surface of the transparent polymeric material phase facing away from the decorative element (the intended outer surface of the add-on part) is provided with a protective coating. The entire surface of the add-on part can also be provided with the protective coating. The protective coating increases the durability of the surface, in particular its scratch resistance and weathering stability, and thus reduces wear. In a preferred embodiment, the protective coating is applied by flow coating. Thus, a homogeneous coating can be achieved with short cycle times. Alternatively, however, other coating methods can also be used, for example, dip or spray coating or in-mold coating methods.

The protective coating is frequently also referred to as "scratch-proof coating", "antiwear coating", or "hardcoat". Preferably used are protective coatings that include thermally curing or UV-curing lacquers, in particular based on polysiloxanes, polyacrylates, polymethylacrylates, polyurethanes, or mixtures or copolymers thereof. The protective coating can have one or a plurality of separately applied layers and preferably has a total layer thickness from 1 µm to 50 µm, particularly preferably from 2 µm to 25 µm. It gives the add-on part good scratch resistance, weathering resistance, as well as chemical resistance. The protective coating can also include UV blockers, preservatives, as well as components for increasing scratch resistance, for example, nanoparticles. Additionally, the protective coating can also perform decorative functions, such as gloss or pearl effects. The protective coating is cured after application, preferably by heating and/or UV radiation.

The protective coating can be implemented by a single layer. However, the protective coating also have a plurality of individual layers. Such a multilayer protective coating preferably comprises, below the actual hardcoat, an adhesion promoting coating, a so-called primer. "Below" means that the primer is arranged between the add-on part and the actual hardcoat. The primer preferably includes polymethylmethacrylate, UV absorbers, and alcoholic solvents. The layer thickness of the primer is, for example, from 0.2 µm to 8.0 µm, preferably from 1.0 µm to 4.0 µm.

The two material phases of the add-on part can, in principle, be made of any polymer that ensures adequate stability. The two material phases of the add-on part preferably include preferably polyethylene (PE), polycarbonate (PC), polypropylene (PP), polystyrene, polybutadiene, polynitrile, polyesters, polyurethane, polymethylmethacrylate (PMMA), polyacrylate, polyamide, polyethylene terephthalate (PET), polybutylene terephthalate (PBT), acrylonitrile butadiene styrene (ABS), styrene acrylonitrile (SAN), acrylonitrile styrene acrylester (ASA), acrylonitrile butadiene styrene—polycarbonate (ABS/PC), PET/PC, PBT/PC, or copolymers or mixtures. Particularly preferred are PC, PMMA, SAN, ASA, PET, or copolymers or mixtures thereof. This is particularly advantageous in terms of transparency, processing, strength, weathering resistance, and chemical resistance.

The material phases can contain inorganic or organic fillers, preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the add-on part. In addition, the fillers can reduce the polymeric material content and thus reduce the production costs.

If a material phase is opaque, it includes at least one colorant. The opacity of the component is achieved by means of the colorant. Inorganic or organic dyes and/or pigments can be used as colorants. The colorant can be colored or achromatic. Suitable colorants are known to the person skilled in the art and can, for example, be looked up in the *Colour Index of the British Society of Dyers and Colourists and the American Association of Textile Chemists and Colorists*. Preferably, a black pigment is used as a colorant, for example, carbon black, aniline black, bone black, iron oxide black, spinel black, and/or graphite. Thus, a black opaque material phase is achieved.

The layer thickness of each material phase is, for example, from 0.5 mm to 20 mm. In particular, the transparent, outward directed material phase should have a layer thickness of at least 1 mm, to ensure good stability of the decorative element. The layer thickness of the transparent, outward directed material phase is preferably from 1 mm to 10 mm, particularly preferably from 3 mm to 7 mm. The layer thickness of the material phase not directed outward is preferably from 0.5 mm to 7 mm, particularly preferably from 1 mm to 5 mm.

Providing the first material phase and applying the second material phase are preferably done by injection molding. In the context of the invention, the term "injection molding" is to be interpreted broadly and includes all methods wherein liquefied polymeric material is injected into a molding cavity and cured. It also includes, in addition to conventional injection molding, further development such as injection compression molding. A carrier mold, which forms part of the molding cavity and carries the add-on part during its production, is preferably moved between the two injection molding devices for producing the two material phases, for example, using turning plate, rotary table, or index plate technology, preferably using a turning plate or a rotary cube. Thus, the first polymeric material phase is moved between process steps (a) and (c). Between the two injection molding steps for producing the first and second material phase, a hot stamping apparatus is moved and arranged relative to the first material phase such that the first material phase can be provided with the decorative element. The relative movement can be done by moving the first material phase or the hot stamping apparatus, in principle, also by a combination of the two.

The invention also includes a device that is suitable for carrying out the method described. The apparatus according to the invention for producing a polymeric vehicle add-on part comprises a carrier mold, a means for producing a first polymeric material phase in the carrier mold or in a cavity formed using the carrier mold, a hot stamping means that can be positioned relative to the prepared first material phase such that a first surface of the first material phase can be stamped with a decorative element, and a means for producing a second polymeric material phase on the first surface of the first material phase. The carrier mold is a mold in or on which the add-on part is arranged in the phases of its production and by which it is carried during the process.

In an advantageous embodiment, the means for producing the first polymeric material phase is a first injection molding device, and the means for producing the second polymeric material phase is a second injection molding device. The injection molding devices include in each case means for liquefying and injecting a polymer mass as well as a mold that is suitable to act along with the carrier mold to form the complete injection mold (cavity) that determines the geometry of the workpiece to be produced. The carrier mold is movably mounted and the arrangement of the two injection molding devices is selected such that the carrier mold is movable from a first position associated with the first injection molding device into a second position associated with the second injection molding device. The apparatus comprises means for moving the carrier mold from the first into the second position. A position is considered to be associated with an injection molding device if it is suitable for filling the injection molding mass by means of said injection molding device into the carrier mold or into the cavity formed by the carrier mold and the counter mold of the injection molding device. Typically, the actual injection operation is preceded by a relative movement of the injection molding device toward the carrier mold to make contact therewith, forming the actual injection mold (cavity).

The positioning of the hot stamping means relative to the first material phase can be done by moving the hot stamping means or the injection mold, in principle, even by a combination of the two.

In a first preferred embodiment, the injection mold is mounted on a turning plate that is rotatable around a spatial axis. Customarily, the two injection molding devices are arranged opposite one another such that the carrier mold arranged on one side of the turning plate is movable by a rotation of approx. 180° from the first position into the second position. Another carrier mold is typically arranged on the other side of the turning plate. When the turning plate is rotated to move the first carrier mold, after injection of the first material phase, into the second position, the second carrier mold automatically arrives in the first position such that simultaneously with the production of the second material phase in the first carrier mold, the first material phase of the next add-on part can already be injected into the second carrier mold. The hot stamping means is movably mounted on a conveyor system and can be brought in between the first injection molding device and the carrier mold or between the second injection molding device and the carrier mold in order to apply the decorative element before the injection of the second material phase onto the first material phase. The add-on part will be removed from the carrier mold after molding of the second material phase. After that, the carrier mold is ready for the next cycle.

In a second preferred embodiment, the carrier mold is mounted on a rotary cube that is rotatable around a spatial axis. The two injection molding devices are preferably arranged opposite one another. The hot stamping means is arranged substantially perpendicular to the axis between the injection molding devices. The carrier mold arranged on one side of the rotary cube can be brought from a first position associated with the first injection molding device by a rotation of approx. 90° into a second position associated with the hot stamping means that is suitable for applying the decorative element on the first material phase with the hot stamping means. By an additional rotation of approx. 90°, the carrier mold can be moved into a third position associated with the second injection molding device. Another rotation of approx. 90° moves the carrier into a fourth position that is preferably used to remove the add-on part from the carrier mold. Preferably, on the other sides of the rotary cube, additional carrier molds are arranged such that a plurality of said positions can be occupied simultaneously by different carrier molds; and, thus, production of an add-on part is begun before production of the previous add-on parts is completed. In principle, instead of a rotary cube, other rotatable tools can also be used, for example, a plate on a rotary table, though, here, fewer carrier molds can be arranged.

The embodiments described are economical production methods suitable, in particular, for mass production.

The apparatus according to the invention is suitable for carrying out the method described and the method is preferably carried out with the apparatus according to the invention. Consequently, the details described above in connection with the method apply analogously to the apparatus and vice versa.

The invention also includes a polymeric vehicle add-on part with a decorative element, comprising a first polymeric material phase, a second polymeric material phase, and a decorative element arranged between the two polymeric material phases, which is applied by hot stamping onto a first surface of the first polymeric material phase or the second polymeric material phase, with at least the first polymeric material phase or the second polymeric material phase being transparent. The polymeric add-on part according to the invention is, in particular, produced or producible with the method according to the invention. The decorative element is arranged at the interface between the first and the second material phase.

The details and preferable embodiments described above in connection with the method and the apparatus apply analogously to the vehicle add-on part according to the invention. In particular, the add-on part has the protective coating described, at least on the surface of the transparent material phase facing away from the decorative element.

The invention also includes the use of the polymeric vehicle add-on part according to the invention as a radiator grill surround, pillar cover, sun visor, roof panel, vehicle window pane, light cover, mirror housing, frame member, trim strip, door sill, spoiler, fitting, or instrument panel. Due to their high weathering stability and scratch resistance, the vehicle add-on parts according to the invention are, in particular, suitable as external add-on parts and are preferably used as such, for example, as a radiator grill surround, pillar cover, sun visor, roof panel, vehicle window pane, light cover, mirror housing, frame member, trim strip, door sill, or spoiler, but can also be used in the vehicle interior, for example, as a fitting or an instrument panel. In the use according to the invention, the transparent material phase of the add-on part is turned outward—the surface of the transparent material phase facing away from the decorative element thus forms the outer surface of the add-on part, whereas the add-on part is secured to the vehicle via the opaque material phase, to the extent such exists.

The invention is explained in detail with reference to drawings and exemplary embodiments. The drawings are schematic representations and not true to scale. The drawings in no way restrict the invention.

They depict.

Figure 1:
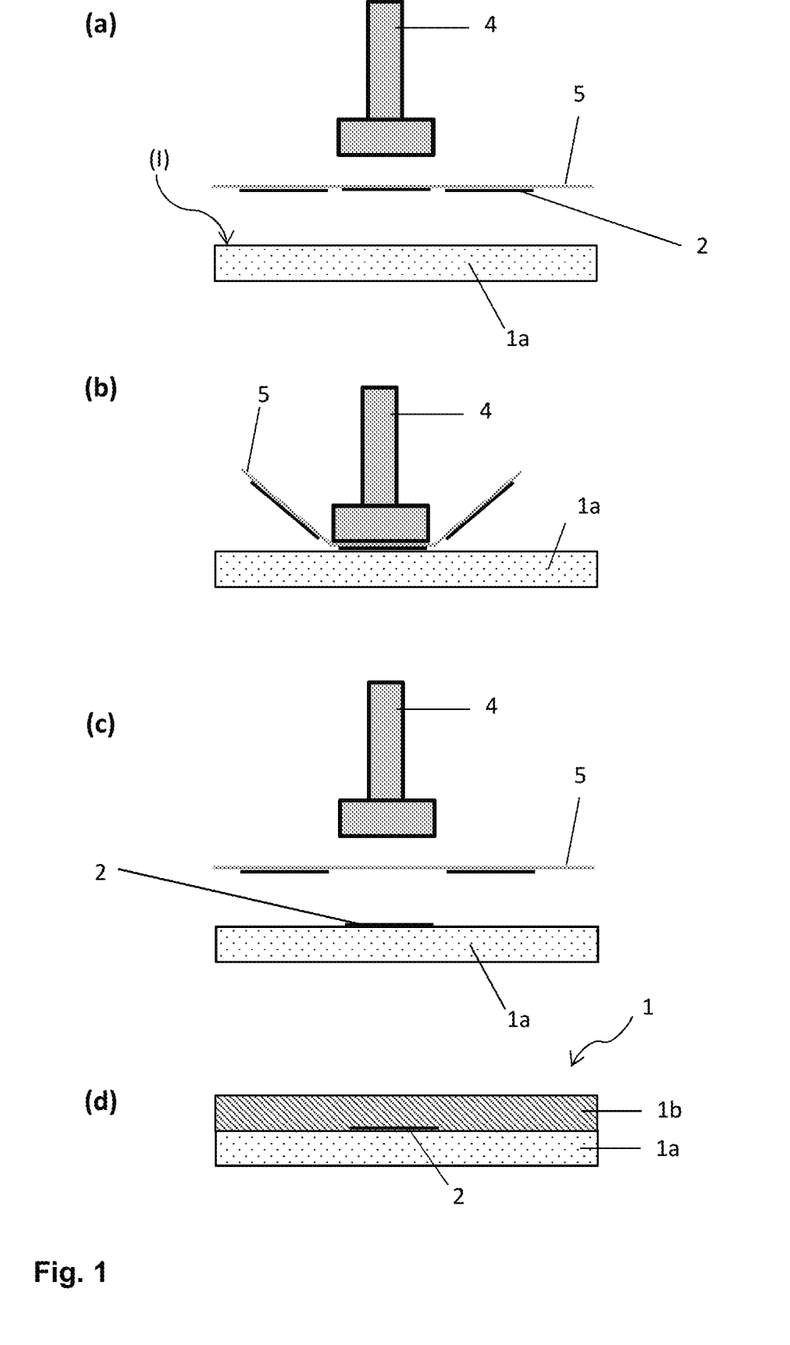
FIG. 1 a stepwise representation of one embodiment of the method according to the invention, FIG. 2 a cross-section through an embodiment of a carrier film with a decorative element, FIG. 3 a cross-section through an embodiment of the polymeric add-on part according to the invention with a decorative element, FIG. 4 a cross-section through an embodiment of the apparatus according to the invention during the method according to the invention in a stepwise representation, FIG. 5 a plan view of another embodiment of the apparatus according to the invention, and FIG. 6 an exemplary embodiment of the method according to the invention with reference to a flowchart.

FIG. 1 depicts a cross-section of a polymeric add-on part 1 at various points in time of the method according to the invention for its production: (a) before the hot stamping of the first material phase 1a, (b) during the hot stamping, (c) after the hot stamping, and (d) after the application the second material phase 1b. The polymeric add-on part 1 is, for example, a plastic window for a motor vehicle, for example, a rear side window. The polymeric add-on part 1 can, however, also be a different add-on part of a vehicle, for example, a pillar cover, a spoiler, or a light cover.

First, a first material phase 1a is produced in the injection molding method, for example, a transparent pane-like or sheetlike material phase with a thickness of 4 mm made of polycarbonate. The transparent first material phase 1a is then positioned in front of a punch 4 (FIG. 1(a)), wherein a first surface I of the material phase 1a is turned toward the punch 4. A decorative element 2 is positioned on a carrier film 5 between the punch 4 and the material phase 1a. The carrier film 5 is a film web with a large number of decorative elements 2, which is rolled up on two rollers (not shown). By this means, the carrier film 5 can be advanced such that another decorative element 2 is transported under the punch 4 and is provided for applying on another material phase 1a.

The decorative element 2 is implemented as a multilayer film, which is described more precisely in the following. For the sake of better understanding, the various decorative elements 2 are depicted as discrete elements on the carrier film 5. However, it is also possible for the multilayer film to cover the carrier film 5 substantially over its entire surface, with the individual decorative elements 2 being detached from the overall film by the effect of adhesion to the first material phase 1a. This detachment can also be facilitated by incisions or perforations in the overall film.

The punch 4 acts on the surface of the carrier film 5 turned away from the decorative element 2 such that the decorative element 2 is pressed against the first surface I of the material phase 1a (FIG. 1(b)), for example, with a pressure of 30 kg/cm$^2$. The punch 4 has, at the time, a temperature of, for example, approx. 160° C. The exposure time of the punch 4 to the surface I is, for example, 2.5 s. The action of the punch 4 is typically achieved by pressing it against the material phase 1a; however, alternatively or additionally, it can be achieved by pressing the material phase 1a against the punch 4.

Then, the punch 4 and the material phase 1a are disengaged again and the carrier film 5 detached, with the decorative element 2 remaining on the surface I of the material phase 1a (FIG. 1(c)).

Then, a second material phase 1b is applied on the first surface of the first material phase 1a in the injection molding method such that the decorative element 2 is arranged at the interface between the first material phase 1a and the second material phase 1b (FIG. 1(d)). Thus, the add-on part 1 according to the invention is created. The opaque phase is made, for example, of a PC/ABS mixture colored black by pigments and has a thickness of 2.5 mm.

The add-on part 1 can then be provided with a protective coating, which, for example, is implemented in two layers and includes an acrylic-based primer and a polysiloxane-based hardcoat applied thereon. Such a protective coating should be applied at least on the surface of the transparent first material phase 1a facing away from the decorative element, which is provided later in the installed position as the outer surface, in order to increase the scratch resistance and weathering stability.

Later in the installed position, the decorative element 2 is always readily discernible through the transparent first material phase 1a. By means of the combination of a transparent material phase 1a, an opaque second material phase 1b positioned therebehind, and the decorative element 2 at the interface of the two material phases 1a, 1b, a glasslike visual impression with a high depth effect is achieved. Production is suitable for industrial mass production, the decorative element 2 is protected in the interior of the add-on part 1 against damage, and the high stability requirements for vehicle components are met (Rigid Plastic Glazings, ECE R43 Annex 14, Class/M). These are major advantages of the present invention.

Figure 2:
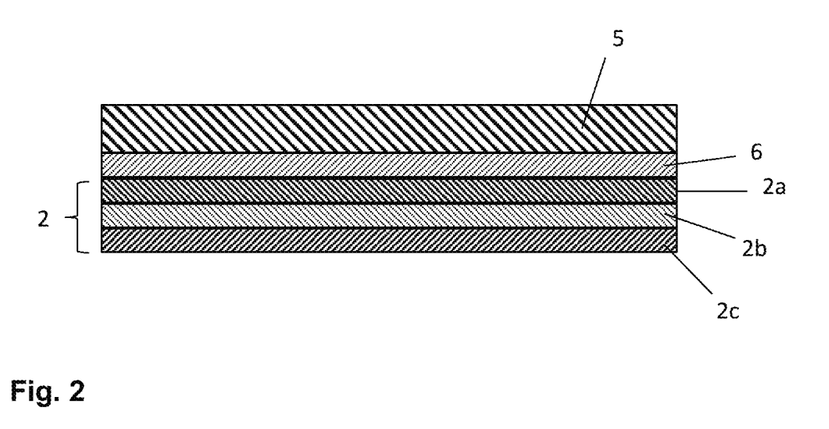

FIG. 2 depicts, by way of example, the structure of a suitable carrier film 5 with a decorative element 2. The carrier film is made of PET and has a thickness of 20 μm. The decorative element 2 consists of three layers, namely, with increasing distance from the carrier film: a protective layer 2a, a decorative layer 2b, and an adhesive layer 2c. The decorative element 2 makes contact with the first material phase 1a via the adhesive layer 2c. The adhesive layer 2c effects strong adhesion between the decorative element 2 and the material phase 1a. The adhesive layer 2c is, for example, a layer of an acrylic-based adhesive with a thickness of 1.0 μm. The decorative layer 2b causes the actual visual impression of the decorative element 2. The decorative layer 2b is, for example, a layer with a thickness of 5.0 μm based on polyacrylate that is colored by embedded or printed pigments or dyes in the form of the desired decoration. The protective layer 2a is, for example, an acrylic-based polymeric layer with a thickness of 1.0 μm. The protective layer 2a protects the decorative layer against mechanical damage when the decorative element 2 is applied on the first material phase 1a.

A release layer 6, which promotes the detachment of the decorative element 2 from the carrier film 5, is arranged between the carrier film 5 and the decorative element 2. The release layer has, for example, a thickness of 0.5 μm.

Figure 3:
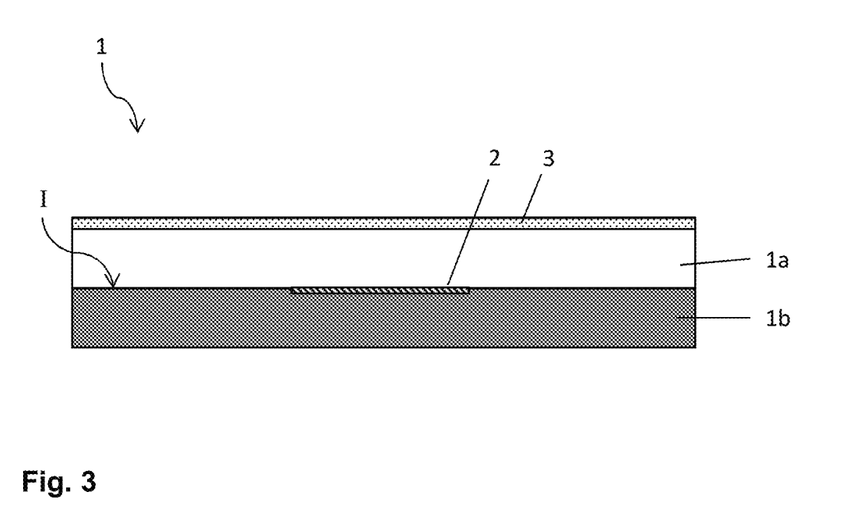

FIG. 3 depicts a cross-section through an add-on part 1 according to the invention with a decorative element 2. The add-on part 1 is made of a transparent material phase 1a and an opaque material phase 1b. Such a structure occurs, for example, in the edge region of windowpanes or full-surface in the case of pillar covers. In the latter case, the transparent phase produces a glasslike effect with a depth effect on the surface of the opaque phase, which is very attractive visually. The transparent material phase 1a is made, for example, of polycarbonate (PC) and has a thickness of 4 mm. The opaque material phase 1b is made, for example, from a PC/ABS mixture colored black by pigments such as carbon black and has a thickness of 2.5 mm. The transparent material phase 1a is intended to be turned toward the external environment in the installed position. The decorative element 2 is then readily discerned through the transparent material phase 1a in front of the opaque material phase 1b.

The surface of the first material phase 1a facing away from the decorative element, which forms the intended outer surface of the add-on part 1, is provided with a protective coating 3, by means of which it is protected against mechanical damage. The protective coating also includes UV blocker, by means of which the decorative element 2 is protected against fading as a result of UV irradiation. The thickness of the protective coating 3 is, for example, approx. 20 μm.

Figure 4:
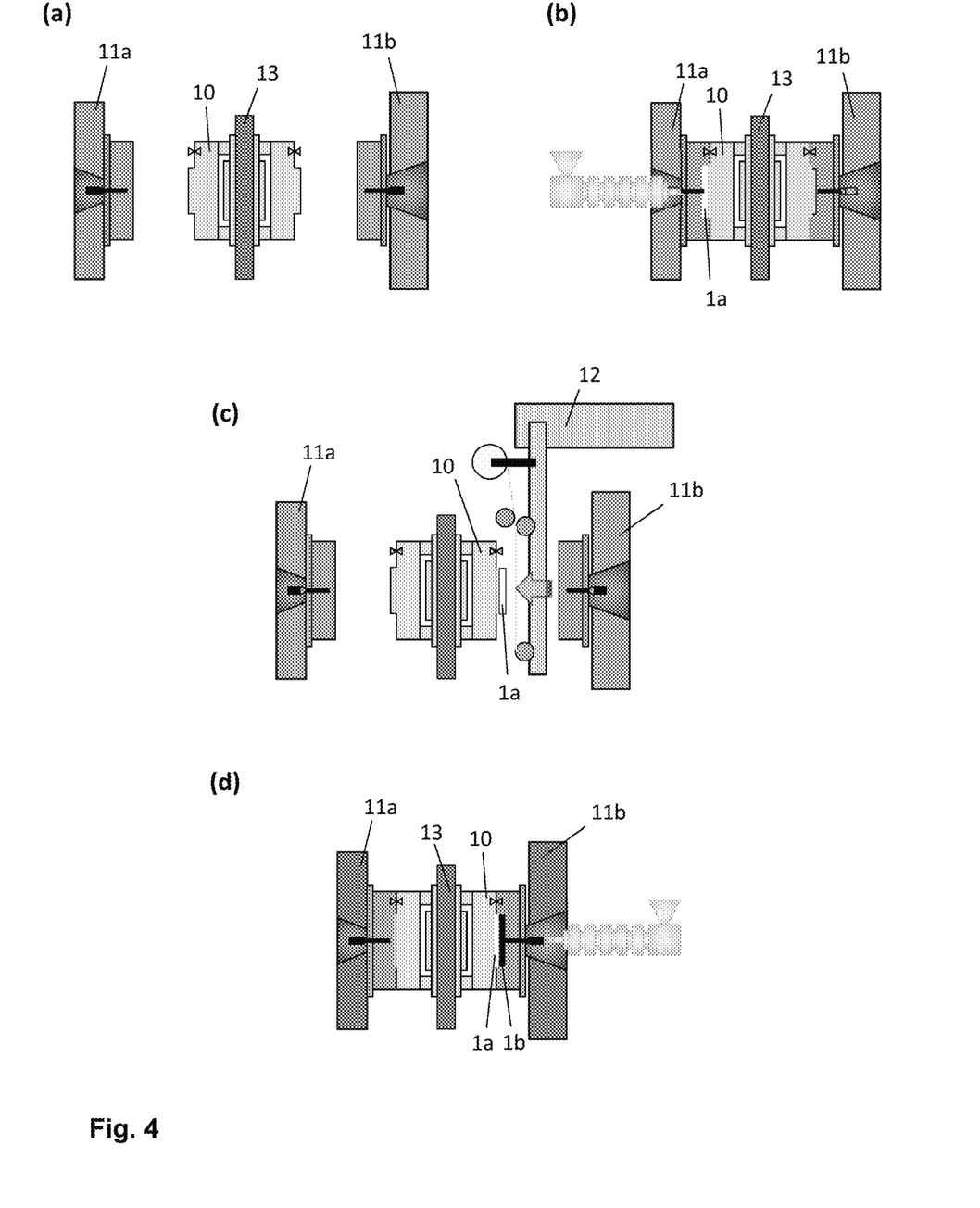

FIG. 4 depicts a cross-section through an apparatus according to the invention for producing a polymeric vehicle add-on part 1 at various points in time of the method according to the invention. The apparatus includes a first injection molding device 11a for producing the transparent first material phase 1a and a second injection molding device 11b for producing the opaque second material phase 1b. The two injection molding devices 11a, 11b are arranged opposite one another. A turning plate 13, which carries a carrier mold 10 on one side, is arranged between the injection molding devices 11a, 11b. Another carrier mold is arranged on the opposite side of the turning plate 13. The injection molding devices 11a, 11b and the carrier molds 10 are arranged at a distance from one another in the initial stage (FIG. 4(a)).

The injection molding devices 11a, 11b are then brought near the carrier molds 10 and brought into contact. A cavity, whose shape corresponds to the desired shape of the first material phase 1a, is formed from the carrier mold 10 and a counter mold of the first injection molding device 11. Then, liquefied transparent polymer is injected through the injection molding device 11a into the cavity, which polymer cures, creating the transparent material phase 1a (FIG. 4(b)).

The injection molding devices 11a, 11b are then moved away from the carrier molds 10 and the turning plate 13 is rotated by 180° such that the carrier mold 10 with the first material phase 1a faces the second injection molding device 11b. Then, a hot stamping means 12 is brought via a conveyor system into the intermediate space between the first material phase 1a and the second injection molding device 11b (FIG. 4(c)). The first surface I of the first material phase 1a is provided by the hot stamping means 12 with the decorative element 2. Then, the hot stamping means 12 is again moved out of the intermediate space. Alternatively, the hot stamping means 12 can also be brought into the intermediate space between the first injection molding device 11a and the carrier mold 10 in order to apply the decorative element already before the rotation of the turning plate 13.

The injection molding devices 11a, 11b are then brought near the carrier molds 10 again and brought into contact. A cavity, whose shape corresponds to the desired shape of the second material phase 1b, is formed from the carrier mold 10 and a counter mold of the second injection molding device 11b. Then, liquefied opaque polymer is injected through the injection molding device 11b into the cavity, which polymer cures, creating the opaque material phase 1b on the transparent first material phase 1a (FIG. 4(d)), with the decorative element 2 arranged at the interface between the two material phases 1a, 1b. The second material phase 1b cures and the injection molding devices 11a, 11b are then moved away from the carrier molds 10. The finished add-on part 1 can then be removed from the carrier mold 10.

The additional carrier mold on the other side of the turning plate 13 is associated in each case with the other injection molding device. Thus, different process steps in the production of two successive add-on parts can be carried out simultaneously: during the production of the first material phase 1a of one add-on part a, the second material phase of the preceding add-on part is injected. After rotation of the turning plate 13, the second material phase 1b of said add-on part is injected at the same time as the first material phase of the next following add-on part. Thus, high cycle times can be achieved.

Figure 5:
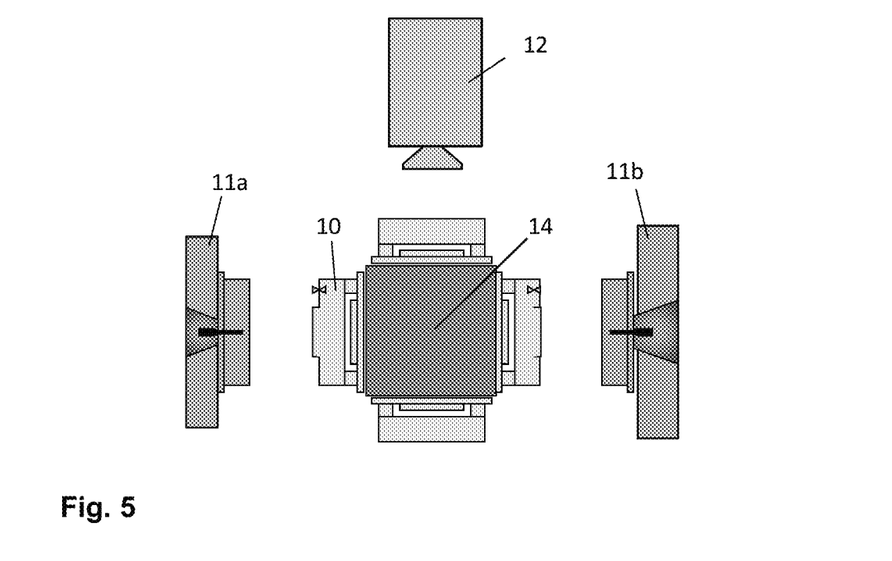

FIG. 5 depicts a plan view of another embodiment of the device according to the invention. Instead of a turning plate 13, here, the carrier mold is arranged on a rotary cube 14, which can be rotated in steps of 90° in each case.

Here as well, the apparatus comprises a first injection molding device 11a and a second injection molding device 11b, which are arranged opposite one another along a connection axis. The hot stamping means 12 is arranged perpendicular to this connection axis. The carrier mold 10 is situated in a first position facing the first injection molding device 11a. After bringing the first injection molding device 11a near the carrier mold 10, the first material phase 1a is produced. One rotation of the rotary cube 14 by 90° moves the carrier mold 10 into a second position, in which it faces the hot stamping means 12. Thus, the first material phase 1a is provided with the decorative element 2. Another rotation of the rotary cube 14 by 90° moves the carrier mold 10 into a third position, in which it faces the second injection molding device 11b. After bringing the second injection molding device 11b near the carrier mold 10, the second material phase 1b is produced on the first material phase 1a. After another rotation by 90°, the carrier mold 10 arrives in a fourth position, in which the finished add-on part 1 can be removed from the carrier mold.

Here again, the remaining sides of the rotary cube 14 are outfitted with carrier molds that occupy the respective other positions such that the apparatus can work simultaneously on four different add-on parts.

Figure 6:
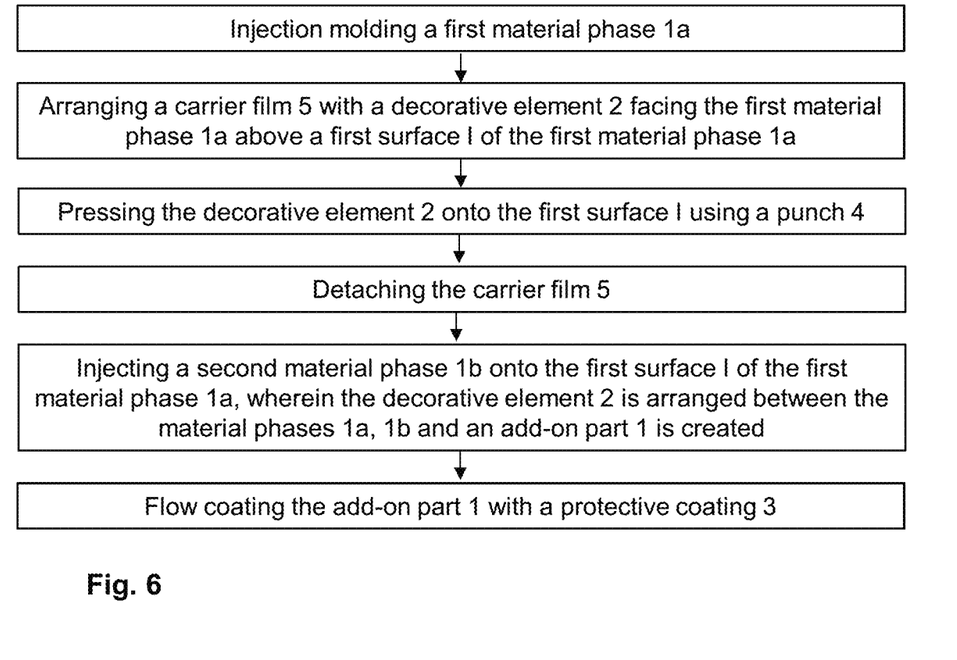

FIG. 6 depicts a flowchart of an exemplary embodiment of the method according to the invention for producing a polymeric vehicle add-on part with a decorative element.

LIST OF REFERENCE CHARACTERS (1) polymeric vehicle add-on part
(1a) first polymeric material phase of 1
(1b) second polymeric material phase of 1
(2) decorative element
(2a) protective layer of 2
(2b) decorative layer of 2
(2c) adhesive layer of 2
(3) protective coating
(4) punch
(5) carrier film
(6) release layer
(10) carrier mold
(11a) first injection molding device
(11b) second injection molding device
(12) hot stamping means
(13) turning plate
(14) rotary cube
(I) first surface of 1a

The invention claimed is:

1. A method for producing a polymeric vehicle add-on part having a decorative element, the method comprising the following process steps:
   (a) providing a first polymeric material phase;
   (b) transferring, by hot stamping using a punch, a decorative element from a carrier film onto a first surface of the first polymeric material phase; and
   (c) applying a second polymeric material phase on the first surface of the first polymeric material phase so as to arrange the decorative element between the first polymeric material phase and the second polymeric material phase,
      wherein at least one of the first polymeric material phase and the second polymeric material phase is transparent,
      wherein the first polymeric material phase and the second polymeric material phase are produced by injection molding, and
      wherein the first polymeric material phase is moved between the process steps (a) and (c) by means of a turning plate or a rotary cube.

2. The method according to claim 1, wherein the process step (b) further comprises:
   arranging the carrier film with the decorative element so that the decorative element faces the first polymeric material phase;
   applying the punch on a surface of the carrier film facing away from the decorative element thereby pressing the decorative element against the first surface; and
   detaching the carrier film so that the decorative element remains on the first surface.

3. The method according to claim 1,
   wherein one of the first polymeric material phase, and the second polymeric material phase is opaque.

4. The method according to claim 3,
   wherein the first polymeric material phase is transparent, and
   wherein the second polymeric material phase is opaque.

5. The method according to claim 1,
   wherein the decorative element comprises a protective layer, a decorative layer and an adhesive layer arranged in this order on the carrier film, and
   wherein a release layer is arranged between the carrier film and the decorative element.

6. The method according to claim 1,
   wherein a surface of the transparent one of the first polymeric material phase, and
   the second polymeric material phase facing away from the decorative element is provided with a protective coating.

7. The method according to claim 6, wherein the protective coating comprises a thermally curing or a UV-curing lacquer.

8. The method according to claim 7, wherein the lacquer comprises at least one of a) polysiloxanes, b) polyacrylates, c) polymethylacrylates, d) polyurethanes, and e) mixtures or copolymers of any one of a)-d).

9. The method according to claim 1, wherein the punch of the process step (b) has a temperature in a range of 120° C. to 250° C.

10. The method according to claim 9, wherein the temperature is in a range of 140° C. to 200° C.

11. The method according to claim 1, wherein the punch acts with a pressure that is in a range of 15 kg/cm² to 50 kg/cm² on the first surface of the first polymeric material phase and with an exposure time of at least one second.

12. The method according to claim 11, wherein the pressure is in a range of 25 kg/cm² to 35 kg/cm².

13. The method according to claim 1, wherein the exposure time is in a range of two seconds to four seconds.

14. The method according to claim 1, wherein the first polymeric material phase and the second polymeric material phase comprise at least one of: a) polycarbonate, b) polymethylmethacrylate, c) styrene acrylonitrile, d) acrylonitrile styrene acrylester, e) polyethylene terephthalate, and f) copolymers or mixtures of any one of a)-e).

15. The method according to claim 1, wherein the first polymeric material phase is produced using a first injection molding device and the second polymeric material phase is produced using a second injection molding device that is arranged opposite the first injection molding device, the method further comprising
   injecting, with the first injection molding device, first polymeric material in a carrier mold to form the first polymeric material phase, moving the carrier mold by the turning plate from a first position associated with the first injection molding device into a second position associated with the second injection molding device, and positioning a hot stamping device to carry out the hot stamping between the first injection molding device and the carrier mold or between the second injection molding device and the carrier mold.

16. The method according to claim 1, wherein the first polymeric material phase is produced using a first injection molding device and the second polymeric material phase is produced using a second injection molding device that is arranged opposite the first injection molding device, and wherein a hot stamping device to carry out the hot stamping is arranged perpendicular to an axis that extends along the first and second injection molding devices, the method further comprising injecting, with the first injection molding device, first polymeric material in a carrier mold to form the first polymeric material phase, and moving the carrier mold using the rotary cube from a first position associated with the first injection molding device, through a second position associated with the hot stamping device, and into a third position associated with the second injection molding device.

* * * * *